(12) United States Patent
Radimirsch et al.

(10) Patent No.: US 6,879,649 B1
(45) Date of Patent: Apr. 12, 2005

(54) RECEIVER AND METHOD FOR DIGITAL TRANSMISSION IN A WIRELESS COMMUNICATION NETWORK

(75) Inventors: Markus Radimirsch, Laatzen (DE); Karsten Brueninghaus, Salzgitter (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,632

(22) PCT Filed: Mar. 18, 1999

(86) PCT No.: PCT/DE99/00758

§ 371 (c)(1),
(2), (4) Date: Dec. 6, 2000

(87) PCT Pub. No.: WO99/52252

PCT Pub. Date: Oct. 14, 1999

(30) Foreign Application Priority Data

Apr. 1, 1998 (DE) ........................................ 198 14 530

(51) Int. Cl.[7] .............................. H04L 7/00; H04L 7/06; H04J 3/06
(52) U.S. Cl. ........................ 375/354; 375/364; 370/516
(58) Field of Search ................................ 375/354, 369, 375/364; 370/516, 337, 503, 480

(56) References Cited

U.S. PATENT DOCUMENTS

| | | | | |
|---|---|---|---|---|
| 43,583 A | * | 7/1864 | Sakoda et al. | ................. 139/71 |
| 5,444,697 A | * | 8/1995 | Leung et al. | ................ 370/207 |
| 5,452,288 A | * | 9/1995 | Rahuel et al. | ............... 370/203 |
| 5,805,646 A | * | 9/1998 | Wang | ........................ 375/354 |
| 6,226,337 B1 | * | 5/2001 | Klank et al. | ................. 375/367 |
| 6,246,735 B1 | * | 6/2001 | Sano et al. | .................. 375/364 |
| 6,359,867 B1 | * | 3/2002 | Ali-Vehmas | ................ 370/331 |

(Continued)

FOREIGN PATENT DOCUMENTS

| | | |
|---|---|---|
| DE | 43 19 216 | 12/1994 |
| EP | 0 649 209 | 4/1995 |
| EP | 0 722 235 | 7/1996 |
| EP | 97 29568 | 8/1997 |

OTHER PUBLICATIONS

Nogami, H. et al., "A Frequency and timing Period Acquisition Technique for OFDM Systems," IEICE Transactions on Communications, vol. E79–B, No. 8, Aug. 1, 1996, pp. 1135–1146.

Schmidl, T.M. et al., "Low–Overhead, Low–Complexity Burst Synchronization for OFDM," 1996 IEEE International Conference on Communications, Converging Technologies for Tomorrow's Applications, Dallas, Jun. 23–27, 1996, vol. 3, Jun. 23, 1996, pp. 1301–1306.

Bruninghaus, K. et al., "Coarse Frame Synchronization for OFDM Based Wireless Communication Systems," 9th IEEE International Symposium on Personal Indoor and Mobile Radio Communications, Boston, MA, Sep. 8–11, 1998, vol. 2, pp. 806–810.

Wächter, "Dus Übertragungsverfahren des zukünftigen digitalen Hörrundfunks," Der Fernmeldeingenieur, 11 and 12/92, pp. 1–43, Described in Specification.

Engels et al., "OFDM Übertragungsverfahren für den digitalen Fernschrundfunk," Rundfunktechnische Mitteilungen 1993, pp. 260–270, Described in Specification.

*Primary Examiner*—Amanda T. Le
*Assistant Examiner*—Cicely Ware
(74) *Attorney, Agent, or Firm*—Kenyon & Kenyon

(57) ABSTRACT

In a method of digital data transmission in a wireless communication network in which a controlling communication takes place within a fixed bandwidth of a channel from a master station to all subscribers (downlink) with the help of a fixed signal frame, and the beginning of the fixed signal frame is marked by a special frame synchronization signal detectable by the subscribers, an occupancy of at least one subband by transmission signals and a non-occupancy of at least one complementary subband by transmission signals is used as a frame synchronization signal.

13 Claims, 5 Drawing Sheets

U.S. PATENT DOCUMENTS 6,370,160 B1 * 4/2002 Knutson et al. ............ 370/503
6,377,566 B1 * 4/2002 Cupo et al. ................. 370/343
6,381,234 B2 * 4/2002 Sakoda et al. .............. 370/336
6,381,251 B1 * 4/2002 Sano et al. ................. 370/480
6,473,438 B1 * 10/2002 Cioffi et al. ................ 370/468
6,516,039 B1 * 2/2003 Taura et al. ................ 375/354

* cited by examiner

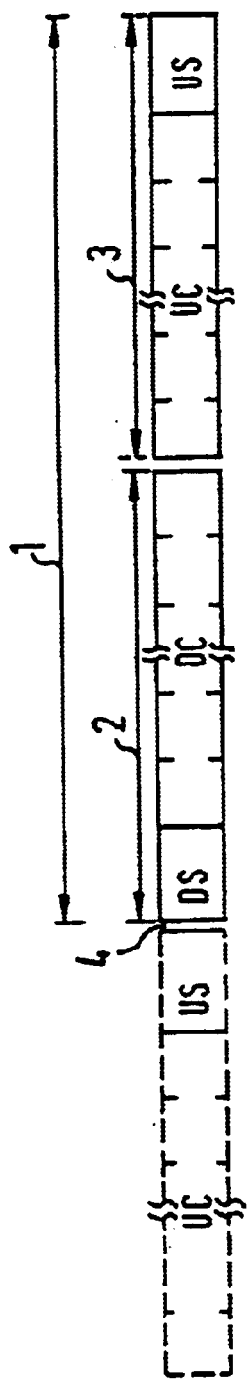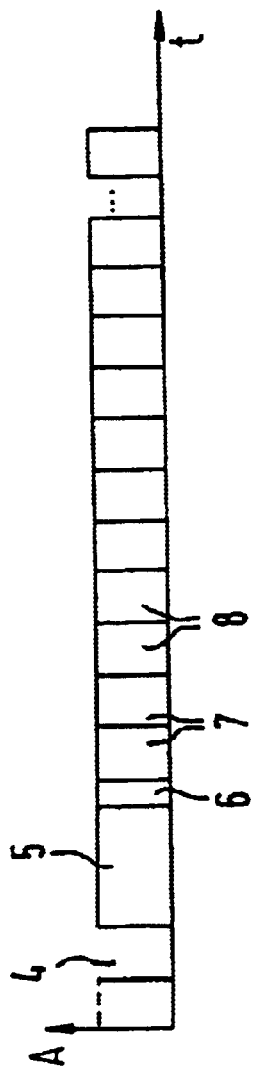

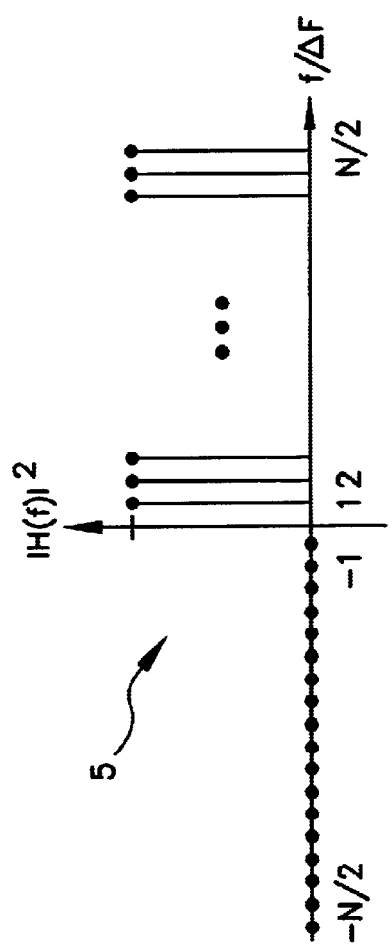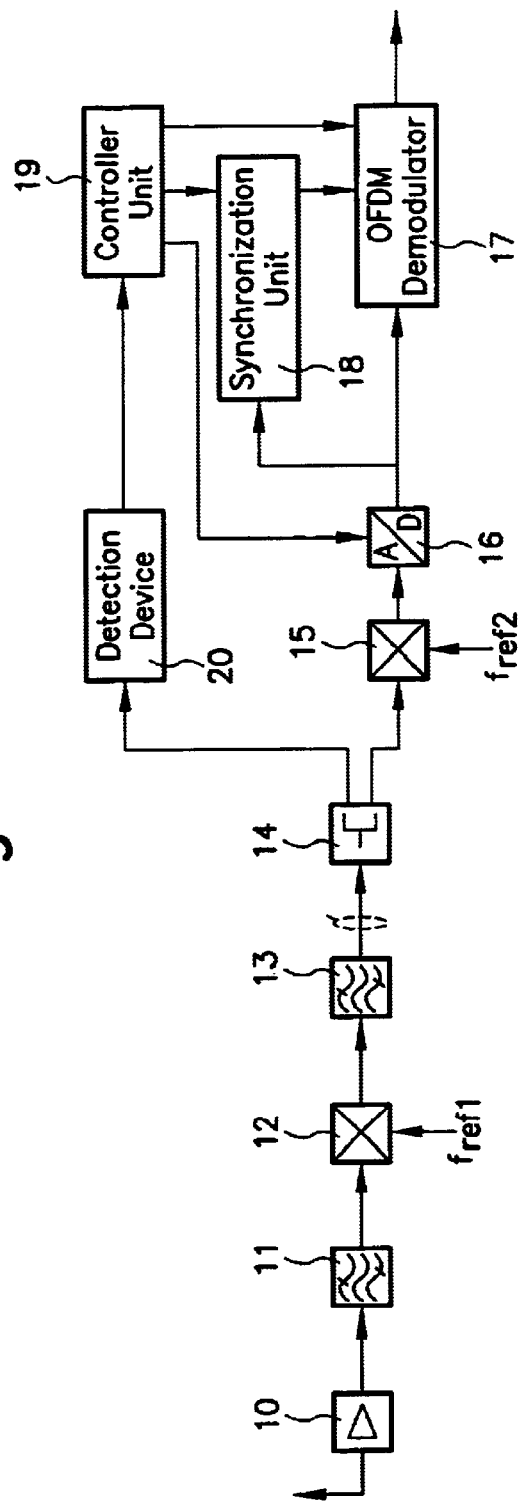

RECEIVER AND METHOD FOR DIGITAL TRANSMISSION IN A WIRELESS COMMUNICATION NETWORK

FIELD OF THE INVENTION

The present invention relates to a method of digital data transmission in a wireless communication network, in which controlling communication takes place within a fixed bandwidth of a channel from a master station to all subscribers (downlink) with the help of a fixed signal frame, and the beginning of the signal frame is marked by a special frame synchronization signal detectable by the subscribers.

Furthermore, the present invention relates to a receiver for receiving data transmitted according to the above-mentioned method.

BACKGROUND INFORMATION

Existing digital data transmission systems such as DAB (Digital Audio Broadcast) or DVB (Digital Video Broadcast) are based on OFDM modulation as described in "Das Obertragungsverfahren des zukünftigen digitalen Hörrundfunks" [Transmission Method of the Future Digital Audio Broadcast] by Wächer, Der Fernmeldeingenieur 11 and 12/92, pp. 1–43; and "OFDM Obertragungsverfahren fur den digitalen Fernsehrundfunk" [OFDM Transmission Method for Digital TV broadcast] by Engels, Rohling, and Breide at pp. 260–270. To make, Rundfunktechnische Mitteilungen 1993, pp. 260–270). To make detection of transmission frames possible, a zero symbol is used in these systems, i.e., no power or very little power is transmitted. In such pure distributed services, the zero symbol only occurs once and therefore its detection in the receiver is simple and unambiguous.

PCT Patent Application No. 97/29568 describes frequency and time synchronization, wherein a combination of a wattless zero symbol, two symbols S1 and S2 that have signals at different frequencies for determining a frequency offset and a time offset, and two symbols S3 and S4 for symbol synchronization, is used. The frequency offset and the time offset are determined using a maximum likelihood estimation, which includes complex digital signal processing, in particular multipliers.

"A Frequency and Timing Period Acquisition Technique for OFDM Systems," presented by H. Nogami et al. at IEICE Transactions on Communications Japan on Aug. 1, 1996, describes the combination of a zero symbol and a pilot for frequency and time synchronization at pp. 1135–1146. The zero symbol is used for the first rough time synchronization. The pilot has a sequence of frequencies in which signal power is transmitted. This sequence is a pseudo-random sequence.

In European Patent No. 0 722 235, time synchronization is achieved by applying a correlation to a signal S0, which has signal power for a pseudo-random sequence of frequencies. For this purpose, reference timing generator 62 is used (Col. 18, lines 18–24). Signal S0 is furthermore used for frequency synchronization. Signal S0 has a symmetrical power distribution as a function of the frequency. A detected asymmetry indicates erroneous synchronization regarding frequency.

"Low-Overhead, Low-Complexity Burst Synchronization for OFDM," presented by T. M. Schmidl et al. at the 1996 IEEE International Conference on Communications (ICC) entitled Converging Technologies for Tomorrow's Applications June 23–27, describes a time synchronization in which a pilot is split in time into two identical halves at pp. 1301–1306. The signal power is distributed to the straight frequencies using a pseudo-random sequence, while the non-straight frequencies remain wattless. According to this paper, an intermediary result is obtained by multiplying a signal value from the first half by the conjugated complex of the corresponding signal value in the second half, then adding these products and dividing the result by the signal power of the second half. Time synchronization is achieved by searching for a maximum.

German Patent No. 4319216 describes that symbols can be transmitted for synchronization purposes; such symbols can be detected in the receiver on the basis of their correlation properties, in particular their self-correlation properties using correlation methods. The correlation method has the disadvantage that it is relatively complicated to implement in the receiver due to the high number of complex multiplications, resulting in high power consumption.

In a communication system in which the transmission channel can be used alternatingly by a base station and by mobile users, as is the case with mobile wireless systems, the zero symbol, which is suitable for pure distributed services for frame synchronization, is ambiguous because prior to the beginning of the transmission from the base station into the transmission channel (downlink) and the beginning of the transmission from a mobile subscriber to the transmission channel (uplink), a Transceiver Turnaround Interval without transmitting power arises and, in addition, the time slots for uplink signaling are not necessarily occupied, since some subscribers may access the transmission channel in random access.

Since the detection of the beginning of a frame, in particular in a wireless TDMA (time division multiple access)-TDD (time division duplex) multicarrier transmission system, is particularly important because the time between two downlink phases (frame time) can vary due to a flexible organization of the multiple access by the subscribers via the downlink, the disadvantages of the correlation method have to be taken into account.

SUMMARY

An object of the present invention is to allow simple detection of the frame start, i.e., the beginning of a downlink phase.

In the method according to the present invention, the occupancy of a first subband by complementary subband by transmission signals is used as a frame synchronization signal. The subbands are separated from one another.

Thus the method according to the present invention provides a frame transmission in which a special frequency pattern is transmitted at the beginning of each transmission frame and detected in the receiver. The frequency pattern has a first subband occupied in a defined manner by transmission signals and at least one complementary subband not occupied by transmission signals.

In an example embodiment of the present invention, one-half of the bandwidth is occupied by transmission signals and the other half of the bandwidth is free of transmission signals. Such a pattern can be generated in an OFDM system in a very simple manner by setting the upper or lower N/2 subcarrier amplitudes of the N available subcarriers to zero.

The frame synchronization signal according to the present invention can be detected according to the present invention in a receiver that has a detection device which has a filter arrangement for splitting the intermediary frequency band into subbands and a comparator for comparing the received transmission power in the subbands. Such a design of the receiver can be implemented at a low hardware cost and can be easily optimized with respect to the required electric power. In particular, the receiver does not need to continuously perform multiplication functions as it does in the correlation method in order to detect a frame synchronization signal. Instead, a power supply of the receiver according to the present invention can be operated in a power-saving mode and switch into a fully operational state upon detection of the frame synchronization signal by the detection device when the full electric power is needed for evaluation of the downlink signal within the signal frame.

Within the context of the present invention it is expedient if uniform amplitude distribution is implemented in the subband occupied by transmission signals. When using N subcarriers in the OFDM system, the phase and amplitude of the N/2 subcarriers occupied by the transmission signals are selected, for example, so that the power is distributed as uniformly as possible among all the occupied subcarriers in order to minimize sensitivity to frequency-selective disturbances in the wireless channel and so that the resulting time signal has an envelope that is as constant as possible in order to avoid problems with non-linear transmission amplifiers.

The frame synchronization signal according to the present invention is unambiguous for the systems to be considered, since all other symbols have a uniform power distribution over the subcarriers used. This is also true for the zero symbol. Accordingly, the frame synchronization signal can be detected by evaluating the power difference in the subbands that are occupied or not occupied. The power difference can be evaluated by an analog or digital method.

The master station transmitting the frame synchronization signal according to the present invention can normally be a base station of a mobile wireless network. It is, however, also possible to permanently or temporarily assign a master function to a subscriber in a network in which the subscribers communicate with one another directly i.e., not through a base station, so that in that case the subscriber represents the master station as defined in the present invention.

BRIEF DESCRIPTION OF THE DRAWINGS

FIG. 1 shows an embodiment of a data structure in a method according to the present invention.

FIG. 2 shows an embodiment of a signal structure of a downlink signal.

FIG. 3 shows a first embodiment of a frame synchronization signal according to the present invention for an OFDM transmission.

FIG. 4 shows a basic structure of a receiver for OFDM signals.

DETAILED DESCRIPTION

Figure 5:
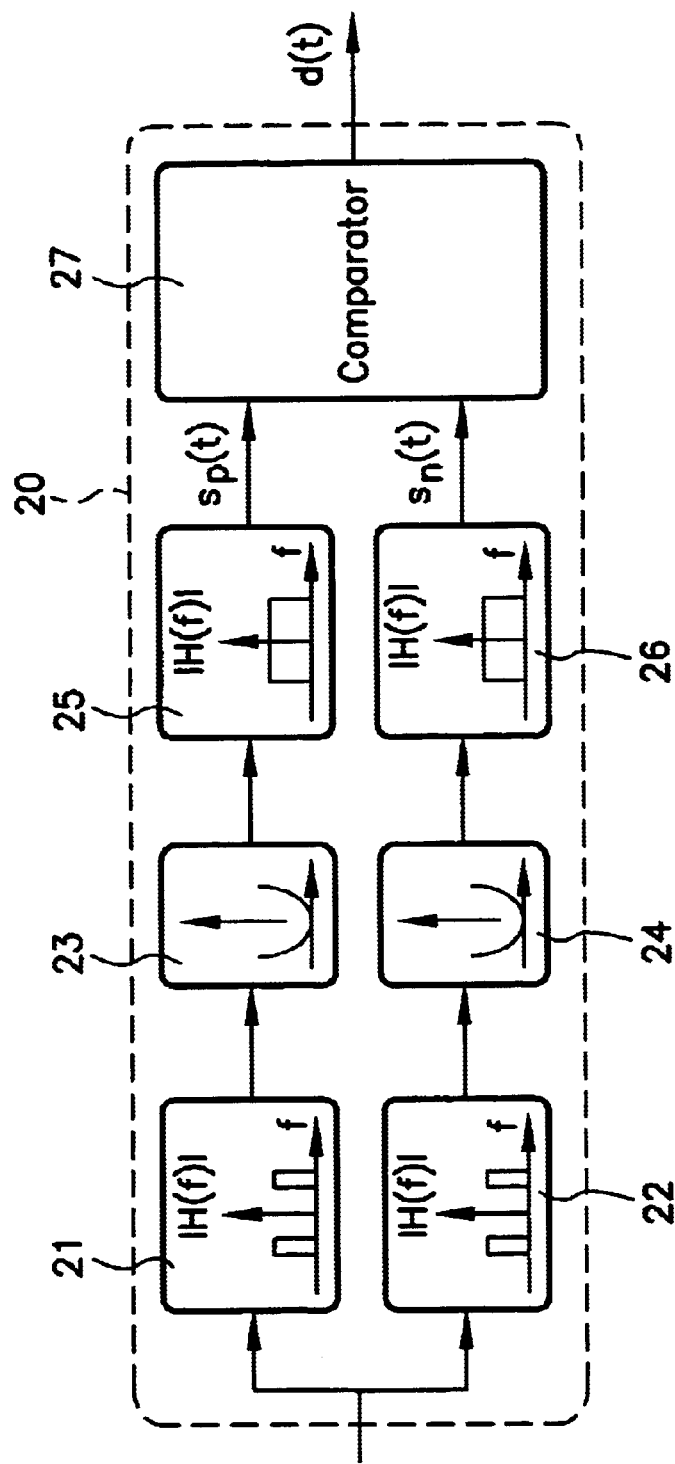
FIG. 5 shows a block diagram of a detection circuit for detecting the frame synchronization signal according to the present invention.

FIG. 1 shows that a signal frame 1 has a downlink phase 2 in which downlink signals DS and DC are transmitted from the base station via the wireless transmission channel to the subscribers, and an uplink phase 3 in which uplink signals UC and US are transmitted from subscribers to the base station via the transmission channel for communication between a base station and a plurality of communication subscribers, e.g., in a mobile wireless network.

FIG. 1 shows short intervals 4 without transmission power prior to the beginning of downlink phase 2 and uplink phase 3, resulting from the switchover of the devices between transmission and reception operation (Transceiver Turnaround Interval). These intervals without transmission power cause the zero signals used as frame synchronization signals to become ambiguous.

The organization of the communication on the transmission channel takes place through the base station by transmitting downlink signal DC in downlink phase 2 through which the individual subscribers are assigned time slots for the transmission of data during uplink phase 3. In uplink phase 3 the subscribers inform the base station of any intention to transmit, which is taken into account when assigning time slots during the next downlink phase 2.

FIG. 2 shows details of the downlink signals in downlink phase 2, which follows switchover interval 4. The downlink signal in downlink period 2 begins with a frame synchronization signal 5, which may be configured according to the present invention as explained in greater detail below with reference to the embodiments. A preamble 6 and two OFDM symbols 7 for fine synchronization follow. These are followed by the required number of data packets 8, from which the variable length of downlink phase 2 results.

One embodiment of a frame synchronization signal 5 is shown in FIG. 3.

N frequencies for subcarriers of an OFDM signal in discrete equal intervals, of which N/2 subcarriers are located on the positive side and N/2 subcarriers are located on the negative side of a main carrier frequency, are plotted on the abscissa.

In the embodiment illustrated, the N/2 subcarriers on the negative (n) side are turned off, i.e., have no signal power. However, the N/2 subcarriers on the positive (p) side are transmitted with the same amplitude to form the frame synchronization signal.

FIG. 4 shows the basic structure of a receiver for an OFDM received signal. The received signal is amplified in an amplifier 10 and pre-filtered using a band-pass filter 11. In a mixer 12, which receives a first reference frequency $f_{ref1}$, the received signal is mixed down to an intermediary frequency, then filtered again using a band-pass filter 13 and split in a branch feeder unit 14. An output branch of branch feeder unit 14 is connected to the input of another mixer 15, which receives a second reference signal $f_{ref2}$. The signal thus mixed into the baseband goes, via an analog-digital converter 16, to an OFDM demodulator 17, as well as to a synchronization unit 18. Synchronization unit 18 is responsible for block, clock, and frequency synchronization. The functions of OFDM demodulator 17 and synchronization unit 18 are controlled by a controller unit 19.

The other output of branch feeder unit 14 goes to a detection device 20 to detect the frame synchronization signal. Detection device 20 generates an output signal with which controller unit 19 is informed of the fact and the time of occurrence of a frame symbol. Subsequently controller unit 19 issues a command to synchronization unit 18 to perform exact synchronization. When this has been completed, synchronization unit 18 transfers the data obtained to OFDM demodulator 17 via frequency offset and block begin; OFDM demodulator 17 then demodulates the signal and provides a received data sequence at the output.

The analog implementation of the frame synchronization signal detection illustrated here has the advantage that it can be performed completely independently of the remaining digital signal processing. The frame start is not detected by actively observing the channel (as is the case with correlation). Instead, upon occurrence of the frame symbol, an event is triggered, i.e., the receiver is passive and is informed by the frame synchronization signal. Thus the method according to the present invention can also be used for waking up the receiver from a power-saving mode, whereby energy-efficient mobile subscriber terminals can be implemented.

FIG. 5 shows the design of a detection device 20 which receives the branched intermediary frequency signal at the output of branch feeder unit 14. This input signal is split into two branches which have a band pass filter 21, 22, a downstream squaring element 23, 24, and a downstream low-pass filter 25, 26, respectively. Band pass filter 21 filters out the upper frequency band (p) and band pass filter 22 filters out the lower frequency band (n). Both filtered-out signal components are mixed non-linearly into the baseband by squaring element 23, 24 and filtered by a low-pass filter 25, 26. The resulting signal in either branch is proportional to the received power within a time window to, which can be varied via the bandwidth of low-pass filter 25, 26. Signals $s_p(t)$ and $s_n(t)$ thus formed are compared in a comparator 27. A sufficiently large difference indicates the reception of the frame synchronization signal. Detection device 20' illustrated in FIG. 6 has the identical components 21 through 26 for generating signals $s_p(t)$ and $s_n(t)$, as well as an identical comparator 27 for the frame synchronization signal according to FIG. 3.

In addition, an adder 28 is also provided in which the two signals $s_p(t)$ and $s_n(t)$ are added and are detected in an analyzer 29 for detecting a zero signal. A sum at the output of adder 28 that is smaller than a threshold value slightly exceeding the noise intensity indicates a zero signal. When a frame synchronization signal is detected, comparator 27 outputs a positive output signal; if a zero signal is detected, analyzer 29 outputs a positive output signal. On the basis of a suitable delay of one of the output signals, an AND gate 30 may output a frame detection signal d(t) to controller 19.

By the use of detection criteria thus implemented for the beginning of a signal frame 1, the likelihood of erroneous detection is considerably reduced. The necessary condition is, of course, that the respective transmitter should transmit a zero signal at the beginning frame 1 immediately before or after the frame synchronization signal according to FIG. 3.

Comparator 27 compares signals $s_p(t)$ and $s_n(t)$ and generates an appropriate output signal d(t).

Figure 7:
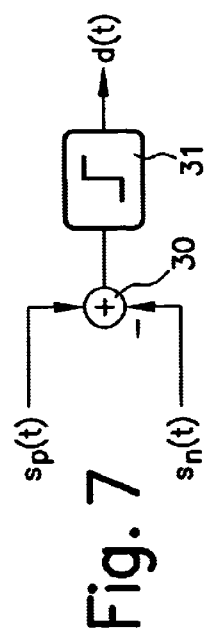
FIG. 7 shows a first embodiment of an analyzer circuit for a frame synchronization signal.

According to FIG. 7, output signal d(t) becomes $$d(t) = \begin{cases} 1 & \text{if } S_p(t) - S_n(t) > \text{threshold} \\ 0 & \text{otherwise} \end{cases}$$

For this purpose the inverted signal $s_n(t)$ is sent to an adder 30 and the difference thus formed is compared to a set threshold in a threshold value detector 31.

If the difference exceeds the set threshold of threshold value detector 31, a potential characterizing the detection of the frame synchronization signal is generated at the output of threshold value detector 31.

This arrangement has the lowest degree of complexity, but has the disadvantage that the optimum threshold depends on the damping of the transmission signal.

Figure 8:
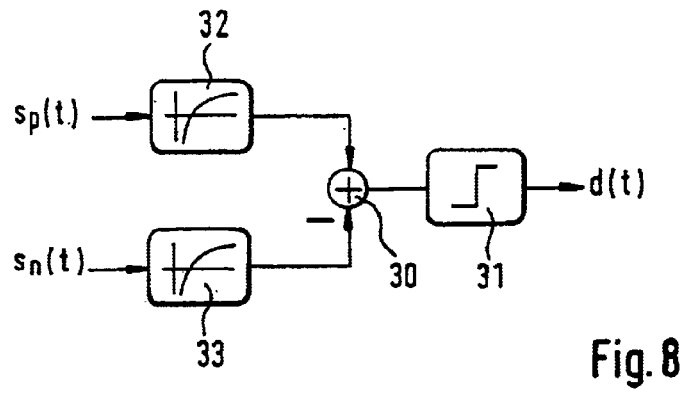
FIG. 8 shows a second embodiment of an analyzer circuit for a frame synchronization signal.

This disadvantage can be avoided using the embodiment according to FIG. 8, in which the two power signals $s_p(t)$ and $s_n(t)$ are divided by each other. Therefore the condition for output signal d(t) is $$d(t) = \begin{cases} 1 & \text{if } \log\left(\frac{S_p(t)}{S_n(t)}\right) > \text{threshold} \\ 0 & \text{otherwise} \end{cases}$$

Hardware implementation includes sending input signals $s_p(t)$ and $s_n(t)$ to a log module 32, 33, respectively, and then forming the difference of the logged signals in adder 30. Mathematically this corresponds to forming the log of the quotients of signals $s_p(t)$ and $s_n(t)$.

Figure 9:
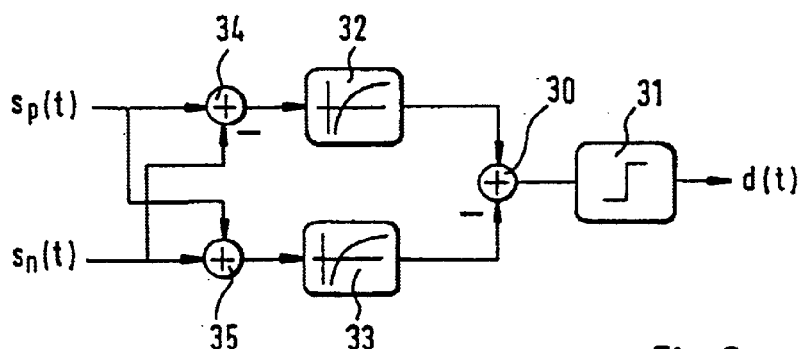
FIG. 9 shows a third embodiment of an analyzer circuit for a frame synchronization signal.

FIG. 9 shows a comparator 27 working with the condition $$d(t) = \begin{cases} 1 & \text{if } \log\left(\frac{S_p(t) - S_n(t)}{S_p(t) + S_n(t)}\right) > \text{threshold} \\ 0 & \text{otherwise} \end{cases}$$

For this purpose log modules 32, 33 have an upstream adder 34, 35, respectively, adder 34 receiving input signal $s_p(t)$ and inverted input signal $s_n(t)$, and adder 35 receiving input signals $s_p(t)$ and $s_n(t)$ without inversion. This design of comparator 27 allows the variance of the time of detection to be reduced compared to the method of FIG. 8.

Figure 10:
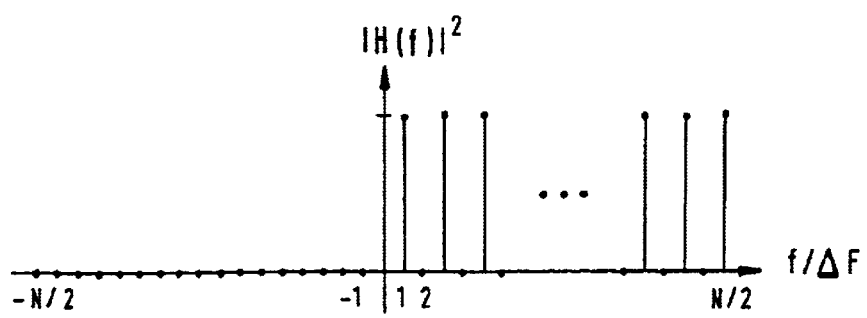
FIG. 10 shows a second embodiment of a frame synchronization signal according to the present invention.

FIG. 10 shows a variant of FIG. 3 for the configuration of the frame synchronization signal according to the present invention. Also in this case, the amplitudes of the subcarriers of the negative side (n) are zero. However, on the positive (p) side only every second subcarrier carries transmission power, while the subcarriers in between also have a zero amplitude.

This results in a periodic frame symbol in the time range. This periodicity can be analyzed using a correlation and used for fine synchronization in synchronization unit 18.

The frame synchronization signal according to FIG. 10 is also useful for performing digital frame detection. The received signal is sampled and processed using a Fourier transform (FFT), with an FFT window of the one-half symbol length (N/2) being used. This guarantees that at least one symbol section is free of interblock interference for each transmitted OFDM symbol. By occupying only every other subcarrier within the positive (p) or negative (n) frequency range the spectrum of absolute values of the frame symbol becomes independent of the position of the time window.

A frame synchronization signal is detected exactly at block k, at which the variable $$D_k = \frac{(\rho_k - n_k)(\rho_k + n_k)}{\rho_k \cdot n_k} \text{ where}$$

$$\rho_k = \sum_{i=1}^{N/2} |R_{i,k}|^2 \text{ and } n_k = \sum_{i=-1}^{-N/2} |R_{i,k}|^2$$

exceeds a predefined threshold value. $R_{i,k}$ denotes the complex output signal of the N/2 FFT at the frequency i$\Delta$F ($\Delta$F=subcarrier interval) and the time kT/2 (T=useful duration of an OFDM symbol).

The frame synchronization method according to the present invention is particularly well-suited for OFDM transmission which is also presented in the example, because in OFDM it is much simpler to generate signals than in the single-carrier method. However the method according to the present invention can also be used in principle with single-carrier transmission methods. In this case sampling values of the time signal can be stored and read when needed.

The intermediary frequency used in the receiver should be as low as possible. This ensures that the bandpass filters can be implemented in a simple manner.

Although the frame synchronization signals illustrated in FIGS. 3 and 10 have only one occupied subband (p) and one unoccupied subband (n), it is also possible in principle to divide the spectrum into four parts, for example, and have different occupancies in the subbands. Further subdivision of the spectrum is possible; however, in general, it is not considered practical.

When the frame synchronization signal only contains power components in a subband, it can still be used as a reference signal for setting an amplitude amplification in the receiver. For this purpose, the frame synchronization signal should be selected so that the envelope is as constant as possible in the time range. This is important for using the frame synchronization signal for setting the amplification control and also to avoid overdriving the transmission amplifier.

The occupancy of the individual subcarriers for the frame synchronization signal is independent of the type of modulation because the frame synchronization signal is not demodulated. Therefore, any points in the signal space (complex plane) can be selected.

In certain cases it has also been found useful to ensure the detection of uplink phase 3. One possible method is switching around the positive and negative side band. For example, only the positive side band (p) may be occupied to detect the beginning of a downlink phase 2, while only the negative side band (n) is occupied to mark the beginning of uplink phase 3. For this purpose one of the comparisons performed by comparator 27 may take place using log modules. Only the signal applied to threshold detector 31 changes.

Figure 6:
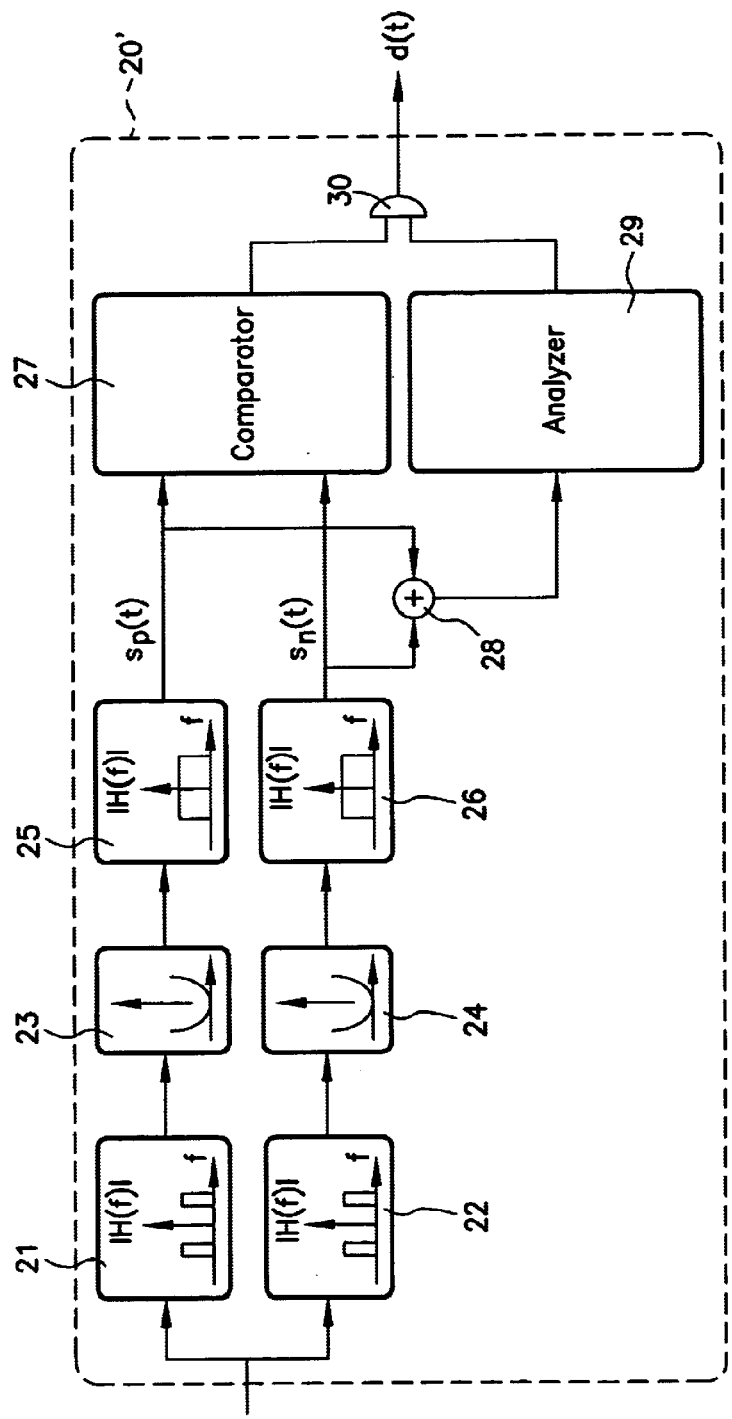
FIG. 6 shows a variation of the detection circuit shown in FIG. 5 for additional detection of a zero signal.

In order to reduce the likelihood of erroneous detection, as a variation to the arrangement of FIG. 6, instead of detecting a zero signal and a frame synchronization signal, a combination of frame synchronization signal 1—frame synchronization signal 2—can also be used to reduce the likelihood of erroneous detection. In this case, for example, all positive subcarrier frequencies may be occupied for the first frame detection signal and all negative subcarrier frequencies may be occupied for the second frame detection signal.

The method according to the present invention has been described for use in Time Division Duplex (TDD) systems. It is, however, also possible to use the method in Frequency Division Duplex (FDD) systems with the appropriate modifications. This can be advantageous, in particular, for implementing power-saving subscriber terminals.

What is claimed is:

1. A method of digital data transmission in a wireless communication network, comprising:
   performing a controlling communication within a fixed bandwidth of a downlink channel between a master station and all subscribers using a fixed signal frame;
   marking a beginning of the fixed signal frame with a frame synchronization signal detectable by the subscribers;
   dividing a bandwidth of the frame synchronization signal into subbands separated from one another, a first part of the subbands being occupied by transmission signals, a second part of the subbands remaining free of transmission signals;
   filtering out the subbands;
   determining a signal power for the subbands; and
   comparing one of a relative signal power and an absolute signal power for each of the subbands with a threshold value to detect the frame synchronization signal.

2. The method according to claim 1, further comprising:
   using at least one additional synchronization signal one of before the frame synchronization signal and after the frame synchronization signal.

3. The method according to claim 2, wherein:
   the at least one additional synchronization signal is a zero signal.

4. The method according to claim 2, wherein:
   the at least one additional synchronization signal is a second frame synchronization signal, the second frame synchronization signal occupying subbands different from the subbands occupied by the first fame synchronization signal with transmission signals.

5. The method according to claim 1, wherein:
   the frame synchronization signal has a maximum of two subbands occupied by transmission signals and a maximum of two subbands free of transmission signals.

6. The method according to claim 1, wherein:
   the subbands occupied by transmission signals have a uniform amplitude distribution.

7. The method according to claim 1, wherein:
   the subbands occupied by transmission signals have subcarriers, the subcarriers having a constant envelope.

8. The method according to claim 7, further comprising the step of:
   using every second subcarrier in the subbands occupied with transmission signals.

9. A receiver for digital data transmission in a wireless communication network, the receiver configured to detect a beginning of a signal frame via a frame synchronization signal, the receiver comprising:
   a detection device including a filtering arrangement and a comparator, the filtering arrangement configured to divide an intermediary frequency band into subbands, the comparator configured to compare a transmission power of a frame synchronization signal in the subbands, the receiver configured to perform the steps of:
   performing a controlling communication within a fixed bandwidth of a downlink channel between a master station and all subscribers using a fixed signal frame;
   marking a beginning of the fixed signal frame with the frame synchronization signal detectable by the subscribers;
   dividing a bandwidth of the frame synchronization signal into the subbands, the subbands being separated from one another, a first part of the subbands being occupied by transmission signals, a second part of the subbands remaining free of transmission signals;
   filtering out the subbands;
   determining a signal power for the subbands; and
   comparing a one of a relative signal power and an absolute signal power for each of the subbands with a threshold value to detect the frame synchronization signal, wherein:
   the receiver is located in one of the master station and other stations.

10. The receiver according to claim 9, further comprising:
   an analyzing unit for detecting a zero signal.

11. The receiver according to claim 9, further comprising:
   a power supply control switchable by the detection device from a power-saving mode into a full operating state, the detection device switching the power supply control in accordance with a detection of the frame synchronization signal.

12. The method according to claim 1, further comprising:
   switching a power supply control of a subscriber from a power-saving mode into a full operating state in accordance with a detection of the frame synchronization signal.

13. The method according to claim 6, wherein:
   the frame synchronization signal has at least one subband occupied by transmission signals and at least one subband free of transmission signals.

* * * * *

UNITED STATES PATENT AND TRADEMARK OFFICE
CERTIFICATE OF CORRECTION

PATENT NO. : 6,879,649 B1
DATED : April 12, 2005
INVENTOR(S) : Markus Radimirsch et al.

It is certified that error appears in the above-identified patent and that said Letters Patent is hereby corrected as shown below:

Column 1,
Lines 23-24, change "digitalen H örrundfunks" to -- digitalen Hörrund funks --.

Column 2,
Line 48, delete "complementary subband by".
Line 49, change "transmission signals is used" to -- transmission signals and the non-occupancy of a second complementary subband by transmission signals is used --.

Column 8,
Line 22, change "the first fame" to -- the first frame --.

Signed and Sealed this

Twenty-third Day of August, 2005

JON W. DUDAS
*Director of the United States Patent and Trademark Office*